United States Patent [19]

Hanson et al.

[11] Patent Number: 4,615,116
[45] Date of Patent: Oct. 7, 1986

[54] SLITTING APPARATUS

[75] Inventors: Thomas E. Hanson, South Deerfield, Mass.; Roger J. Sevigny, Hartford, Conn.

[73] Assignee: United Technologies Corporation, Hartford, Conn.

[21] Appl. No.: 689,252

[22] Filed: Jan. 7, 1985

[51] Int. Cl.⁴ .............................................. H02G 1/12
[52] U.S. Cl. ...................................... 30/90.4; 30/90.8
[58] Field of Search .................... 30/90.4, 90.6, 90.7, 30/90.8, 90.9, 91.1; 81/9.4, 9.41, 9.42, 9.43, 9.44

[56] References Cited

U.S. PATENT DOCUMENTS

| 1,113,986 | 10/1914 | Gregson | 30/91.1 |
| 2,754,707 | 7/1956 | Hill | 30/90.8 |
| 3,375,579 | 4/1968 | Slonksnes | 30/90.8 |
| 3,537,349 | 11/1970 | Scott | 30/90.9 X |
| 3,600,805 | 8/1971 | Stuckel | 30/90.9 |
| 3,988,826 | 11/1976 | Heikala | 30/90.9 |
| 4,120,217 | 10/1978 | Rodd | 30/90.6 |
| 4,189,799 | 2/1980 | Litehizer | 30/90.6 |
| 4,309,822 | 1/1982 | Chirichigno | 30/90.9 |
| 4,387,746 | 6/1983 | Meehan | 30/90.4 |
| 4,447,949 | 5/1984 | Kane | 30/90.6 |
| 4,455,745 | 6/1984 | Toeppan | 30/90.6 |

Primary Examiner—Jimmy C. Peters
Attorney, Agent, or Firm—Francis J. Maguire, Jr.

[57] ABSTRACT

A slitter is disclosed for slitting a cable-like item longitudinally to a controlled depth with a blade. The cable-like item is drawn through a guide which is shaped to correspond to the cross-section of the item, thereby ensuring proper twist as the item is drawn under the slitter blade.

2 Claims, 5 Drawing Figures

SLITTING APPARATUS

DESCRIPTION

1. Technical Field

The present invention relates to a device for longitudinally cutting a cable-like item to a controlled depth in a guided manner.

2. Background Art

It is often necessary to slit a cable-like item longitudinally to a precise depth where the line of cutting must be precisely controlled. For instance, it is often desired to remove the outside jacket from a twisted pair of insulated wires. Because the helically twisted pair of wires has such an odd configuration, it is difficult if not impossible to remove the outside jacket using standard wire stripping tools without nicking the insulation on the inside wires.

A cable stripper having a knife cutting edge in a cable guide for slitting cable longitudinally drawn through the guide and under the knife edge is known. In U.S. Pat. No. 3,898,733 granted to Cormier a hand tool is disclosed in which the knife edge is positioned within a pair of oppositely extending curved members which embrace and guide the cable. The knife edge extends into the guideway sufficiently to slit the cable as it is pulled through the guideway. According to the Cormier disclosure, twisted cable can also be stripped using the disclosed device "as it is very easy to allow the stripper to follow the twist and thereby strip parallel to the twisted wires". However, despite this claim, the Cormier disclosure does not guarantee that the stripper will follow the shape of the wire nor that the depth of the cut can be accurately controlled.

Thus, a need exists for a means of facilitating the removal of the outside jacket from twisted cable in which the cut can be accurately controlled so that the inside insulation is not damaged.

DISCLOSURE OF INVENTION

The object of the present invention is to provide a slitting apparatus for slitting a cable-like item which slits the item according to the shape of the item's cross-section and slits the item to an accurately controlled depth.

According to the present invention, apparatus for slitting a cable-like item is disclosed having a slitting member mounted in a housing with a passage therein for longitudinally passing the cable-like item through a specially shaped guide means mounted on the housing. The slitting means is positioned on the housing in such a way that the cutting edge is fixed with respect to the guide means. The guide means has an aperture shaped to conform to the cross-section of the cable-like item. As the item is drawn through the apparatus by machine or by hand, the aperture guides the cable-like item under the slitting member as it is slit during passage through the apparatus. The slitting means can be a knife blade having a cutting edge disposed within the aperture within the guide means. The aperture may be shaped substantially the same as the cross-section of the cable-like item. Thus, for example, a twisted pair of wires having an outside jacket may be forced through an aperture having a peanut shaped cross-section which forces the twisted pair to rotate in a helical fashion in its passage through the aperture. With the knife edge disposed at a precise depth between the two wires within the aperture, the outside jacket is slit along a helical line as the twisted pair rotates through the aperture.

In further accord with the present invention, the apparatus may be adapted for use as a hand tool. In a simple embodiment a transparent plexiglass face plate having an aperture conforming to the shape of the cross-section of the cable to be slit is mounted on a housing having a blade mounted therein. The housing has a central passageway for hand-pulling the cable through. The face plate's aperture is positioned in front of one end of the passageway and the knife edge is positioned within the aperture so as to slit the cable as it passes through the aperture. If the cross-section has an odd shape the cable will twist as it is pulled through the aperture and the cutting line will describe a path which corresponds to the twist of the cable.

In still further accord with the present invention, the housing means can be split into two parts. One part can be used to hold the knife blade and the other to hold the guide. The two parts are then mounted in operative relation to one another such that they are movable with respect to one another in a controlled manner so as to control the position of the cutting edge with respect to the guide. This may be accomplished in a hand tool implementation by spring mounting one part to the other and using a cam lock lever linked to one part to produce a cam action against a surface of the other part to force the two parts together or to release the two parts.

The invention may be used not only for hand tool purposes but for automated purposes in which the inventive concepts are implemented in a machine context. Thus, the fact that the best mode embodiment disclosed below will include a hand tool implementation, the inventive concepts disclosed herein are widely applicable to other slitting applications including any cabled wire bundle with a definite cross-sectional shape and including all sizes of cabling. The invention may also be employed for cutting single conductor cable or other cable requiring a controlled depth of cut. In addition, any cable-like item with a definite cross-sectional shape that requires a controlled depth of cut in a specific cross-sectional location may be readily cut using the present invention. Examples include tubing, rope, and piping.

These and other objects, features and advantages of the present invention will become more apparent in the light of the following detailed description of an exemplary embodiment thereof as illustrated in the accompanying drawing.

BEST MODE FOR CARRYING OUT THE INVENTION

Figure 1:
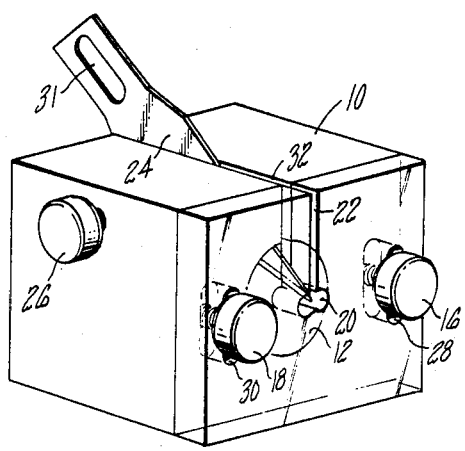
FIG. 1 is a simplified perspective illustration, not to scale of a cable slitter according to the present invention.

Referring first to FIG. 1, a perspective illustration of a hand tool embodiment according to the present invention is illustrated. A metal block 10 having a cylindrical bore 12 drilled through the block has a plexiglass guide plate 14 attached thereto by means of two screws 16, 18. The plexiglass plate 14 has an aperture 20 in the center from which a slot 22 is cut to one of the edges of the plate. A blade 24 is mounted in the block 10 by means of a set screw 26 which holds the blade in a fixed position with respect to the guide plate 14. In particular, the point of the blade 24 is positioned within the aperture 20 in a fixed relationship for proper cutting of a cable-like item which may be passed through the aperture 20. The plexiglass plate 14 has two slotted holes 28, 30 through which screws 16, 18 pass. The plexiglass plate 14 may be positioned in such a way with respect to the block 10 that the point of the blade 24 can be moved about and positioned with respect to the aperture 20 in a very exact manner. The blade has several slots 31 which permit the blade to be positioned with respect to the set screw 26. The block 10 also has a slot 32 which is cut from one edge of the block 10 all the way through to the central bore hole 12. The block's slot 32 is used to allow mounting of the blade 24 within the block 10.

In FIG. 1, the aperture 20 is illustrated having a peanut shape. This corresponds roughly to the shape of the cross-section of a jacketed twisted pair of wires. If such a wire is drawn through the central bore hole 12 in through the aperture 20 under the knife edge which has been precisely positioned, the outside jacket may be slit along a helical line between the two wires as the cable rotates when pulled by hand through the aperture. Thus, the outside jacket is slit without damaging or even slightly nicking the inside wires' insulation. The slit jacket may then be removed using another tool such as a jackknife.

Figure 4:
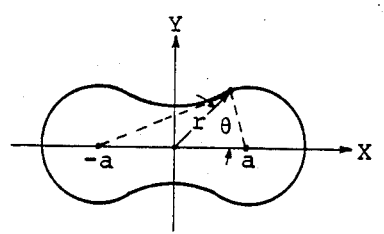
FIG. 4 is a sketch of an oval of Cassini.

The "peanut shape" of the aperture roughly corresponds, in mathematical terms, to an oval of Cassini. This is a curve having the locus of points such that the product of the distance of each point from two fixed points, separated by a distance 2a apart, is a constant $b^2$. The polar equation for the curve is $r^4 + a^4 - 2a^2r^2\cos 2\theta = b^4$. The "peanut shape" occurs where $b > 2$. See FIG. 4 for a representative curve.

Figure 2A:
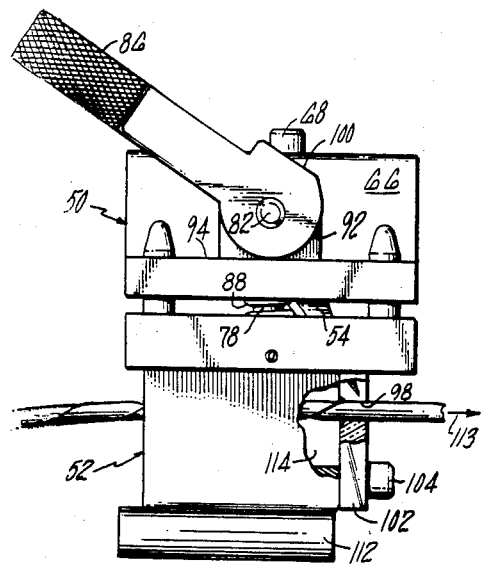
FIG. 2A and 2B is an illustration of an alternate embodiment of a cable slitter according to the present invention.
Figure 2B:
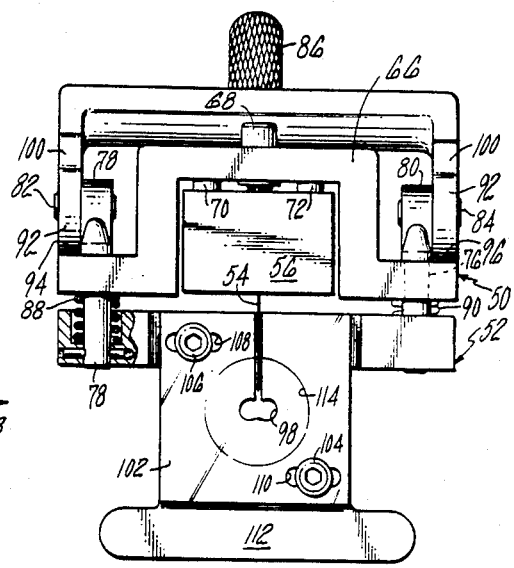
Figure 3:
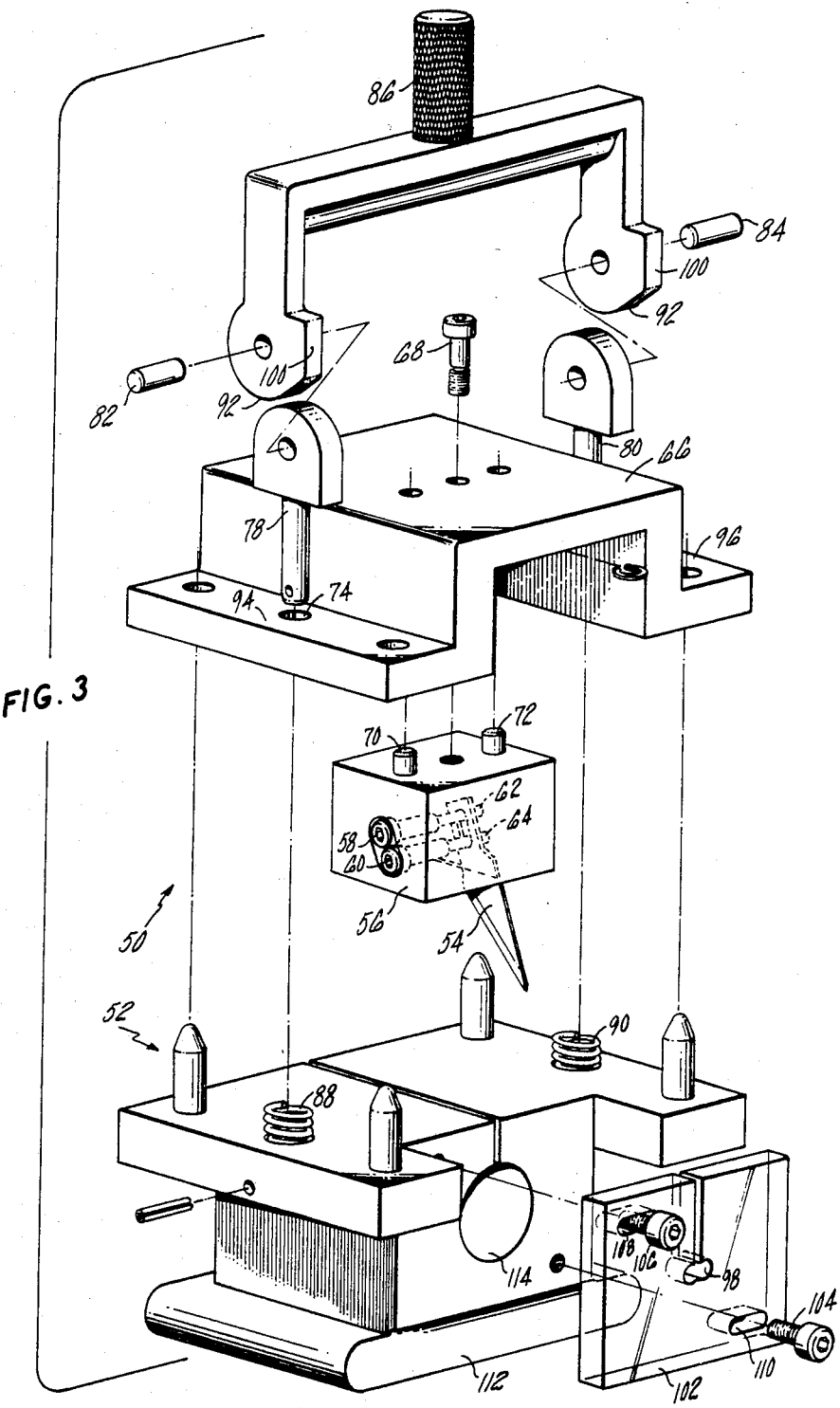
FIG. 3 is a perspective illustration of the embodiment of FIG. 2.

In a more sophisticated version of the hand tool of FIG. 1, an alternate embodiment of the present invention is illustrated in FIGS. 2A, 2B, and 3. There, the housing is split into two parts 50, 52. The upper portion of the housing 50 holds a blade 54 within an internal block 56 within which two set screws 58, 60 are used to pin the blade 54 using two pins 62, 64. The internal block 56 is attached to a lock plate 66 with a screw 68 and is doweled using two dowel pins 70, 72. The lock plate 66 has through holes 74, 76 through which support pins 78, 80 pass. Each of the support pins 78, 80 is fixedly attached to the lower half block 52 by pins, press fitting, or some other suitable method. Pins 82, 84 are used to attach a cam lock lever 86 to the upper half of the block 50. The upper half of the housing 50 is spring loaded by means of springs 88, 90 to the lower half of the housing 52. The cam lock lever 86 may be used to force the upper part of the housing 50 by means of the cam surface 92 rolling along surfaces 94, 96 into closer contact with the lower part of the housing 52. Thus, the blade 54 may be exactly positioned within an aperture 98. The flat portion of the cam surface 100 may be used to lock the lever in place.

A transparent face plate 102 may be positioned with screws 104, 106 in such a manner as to position the aperture horizontally with respect to the blade tip. Horizontal slots 108, 110 are provided for this purpose. The lower half of the housing 52 has a base 112 section with a grip feature for ease of handling.

Cable is fed through a central bore 114 in the housing 52, through the aperture 98 as in FIG. 1, in the direction shown by an arrow 113.

FIG. 3 is an exploded perspective illustration of the apparatus of FIG. 2 with most of the illustrated and numbered pieces identified. FIG. 3 will not be discussed in detail but is merely presented as an aid in conceptualizing the apparatus of FIG. 2.

Although the invention has been shown and described with respect to illustrated embodiments thereof, it should be understood by those skilled in the art that the foregoing and various other changes, omissions, and additions in the form and detail thereof may be made therein without departing from the spirit and scope of the invention.

We claim:

1. Apparatus for slitting the outer jacket of a cable having a pair of insulated wires twisted in the form of a helix within the outer jacket, comprising:
   housing means, having a passage therein for longitudinally pulling the cable therethrough;
   slitting means, mounted on said housing means for slitting the outer jacket of the cable at a controlled depth; and
   transparent sheet guide means, mounted on said housing means having a peanut shaped aperture for causing the cable to twist with respect to the slitting means as the cable is slit during said pulling through said apparatus.

2. Apparatus for slitting the outer jacket of a cable having a pair of insulated wires twisted in the form of a helix within the outer jacket, comprising:
   slitting means, for slitting the outer jacket of the cable at a controlled depth;
   guide means, having a peanut shaped aperture; and
   housing means, in two parts spring mounted in operative relation to one another, such that said slitting means is mounted on a first part and said guide means is mounted on a second part, said first and second parts being moveable in a controlled manner with respect to one another by action of a cam lock lever linked to said second part and adapted for cam action against a surface of said first part so as to control the position of said slitting means with respect to said guide means.

* * * * *